US009762587B2

United States Patent
Brucker et al.

(10) Patent No.: US 9,762,587 B2
(45) Date of Patent: Sep. 12, 2017

(54) GROUPING ACCESS CONTROL VIOLATIONS FOR PROCESS-AWARE SYSTEMS

(71) Applicant: SAP SE, Walldorf (DE)

(72) Inventors: Achim D. Brucker, Sheffield (GE);
Helmut Petritsch, Karlsruhe (DE)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 14/968,802

(22) Filed: Dec. 14, 2015

(65) Prior Publication Data

US 2017/0171215 A1     Jun. 15, 2017

(51) Int. Cl.
| | |
|---|---|
| G06F 21/60 | (2013.01) |
| H04L 29/06 | (2006.01) |
| H04L 12/26 | (2006.01) |
| G06F 9/48 | (2006.01) |

(52) U.S. Cl.
CPC .............. *H04L 63/102* (2013.01); *G06F 9/48* (2013.01); *H04L 43/045* (2013.01); *H04L 63/1425* (2013.01); *H04L 63/1433* (2013.01); *H04L 63/20* (2013.01)

(58) Field of Classification Search
CPC .................................. H04L 63/10; H04L 63/12
See application file for complete search history.

(56) References Cited

U.S. PATENT DOCUMENTS

| | | | |
|---|---|---|---|
| 2010/0223658 A1* | 9/2010 | Narasimhan | G06F 21/554 |
| | | | 726/4 |
| 2012/0023576 A1* | 1/2012 | Sorensen | G06F 21/577 |
| | | | 726/22 |

OTHER PUBLICATIONS

Basel Committee on Banking Supervision: Basel III: A global regulatory framework for more resilient banks and banking systems, Bank for International Settlements Communications 2010, Dec. 2010, 77 pages.
Fox et al., "IT Control Objectives for Sarbanes-Oxley: The Role of IT in the Design and Implementation of Internal Control Over Financial Reporting," 2nd Edition, Sep. 2006, IT Governance Institute, Rolling Meadows, IL, USA, 128 pages.
Ghose, "Information Disclosure and Regulatory Compliance: Economic Issues and Research Directories," New York University—Leonard Stem School of Business, Jul. 2006, retrieved from Internet: URL:http://ssrn.com/abstract=921770>, 18 pages.

(Continued)

*Primary Examiner* — Izunna Okeke
(74) *Attorney, Agent, or Firm* — Fish & Richardson P.C.

(57) ABSTRACT

Methods, systems, and computer-readable storage media for analyzing access control violations of a computer-implemented process. Implementations include actions of receiving a request including violation data indicating an access control violation that occurred during execution of the computer-implemented process, requesting a process model from a process model database, the process model including a computer-readable representation of the computer-implemented process, and a task corresponding to the access control violation, processing the task and the process model to provide correlation data including one or more of grouped violations, a set of granted accesses, and a set of violations, and transmitting the correlation data to a client-side computing device for display to a user.

14 Claims, 6 Drawing Sheets

(56) References Cited

OTHER PUBLICATIONS

Centers for Medicare and Medicaid Services, 'HIPAA: Health Insurance Portability and Accountability Act of 1996' [online], retrieved on Dec. 10, 2012, from Internet: URL<http://www.cms.hhs.gov/HIPAAGenInfo/>, 2 pages.
Kalsalis et al., "A dynamic context-aware access control architecture for e-services," Computers & Security, vol. 25, Issue 7, Oct. 2006, pp. 507-521.
OASIS, "Web Servives Business Process Execution Language Version 2.0," OASIS 1993-2007, Apr. 11, 2007, 264 pages.
Object Management Group (OMG), "Business Process Model and Notation (BPMN)—Version 2.0," Jan. 2011, 538 pages.
Proctor et al., "MarketScope for Segregation of Duty Controls within ERP and Financial Applications," ID No. G00161625, Gartner Research, Sep. 25, 2008, 12 pages.
Sneller et al., "Sarbanes Oxley Section 404 Costs of Compliance: a case study," Corporate Governance: An International Review, vol. 15, No. 2, Mar. 2007, pp. 101-111.

\* cited by examiner

GROUPING ACCESS CONTROL VIOLATIONS FOR PROCESS-AWARE SYSTEMS

BACKGROUND

Computer-implemented enterprise systems (e.g., enterprise resource planning (ERP) systems, customer relationship management (CRM) systems) can be required to enforce a variety of different and complex security policies. If an enterprise operates in regulated sectors (e.g., healthcare, financial), for example, the enterprise may be required to prove that its information technology (IT) systems comply with applicable regulations.

In some cases, these complex security and compliance policies change frequently. This can result in frequent, unintended violations of policies. For example, a policy can change and users that had been permitted to access particular resources are no longer permitted to access the resources. A user may be unaware of, or forgotten the policy change, and may attempt to access the resources, resulting in a policy violation. Further, an increasing number of enterprise systems use more flexible approaches for access control (e.g., break-glass access control) that allows users (in a controlled manner) to override access control restrictions.

Both trends result in an increased need for effective and efficient mechanisms for the post-hoc audit of access control violations. That is, during an audit, an auditor must dig through numerous logged accesses, which could indicate a policy violation, and filter out incidents caused by changes in security policies and/or inaccurate or outdated policies. This can be time and resource intensive.

SUMMARY

Implementations of the present disclosure are directed to using computer-readable process models in post-hoc audits of policy violations. In some implementations, actions include receiving a request including violation data indicating an access control violation that occurred during execution of the computer-implemented process, requesting a process model from a process model database, the process model including a computer-readable representation of the computer-implemented process, and a task corresponding to the access control violation, processing the task and the process model to provide correlation data including one or more of grouped violations, a set of granted accesses, and a set of violations, and transmitting the correlation data to a client-side computing device for display to a user. Other implementations of this aspect include corresponding systems, apparatus, and computer programs, configured to perform the actions of the methods, encoded on computer storage devices.

These and other implementations can each optionally include one or more of the following features: processing the task and the process model includes determining, based on the task and the process model, a set of predecessor tasks relative to the task, each task in the set of predecessor tasks being required to be executed to achieve a goal of the process, determining, based on the set of predecessor tasks, a set of paths, each path defining a series of tasks from a respective predecessor task that are performed to achieve the goal of the process, and providing the grouped violations based on paths in the set of paths; the grouped violations are further provided based on log data provided from a system log, the log data including one or more access request violations; processing the task and the process model includes receiving a computer-readable security policy associated with the process model, and identifying constrained tasks of the process model based on the computer-readable security policy, wherein the set of violations and the set of granted accesses are provided based on the constrained tasks; the set of violations and the set of granted accesses are further provided based on log data provided from a system log, the log data including one or more access request violations; constraints associated with constrained tasks include one or more of separation of duty, binding of duty, and need-to-know; and the process model includes a predefined process model, or an empirically determined process model.

Implementations of the present disclosure provide one or more advantages. For example, the runtime performance is improved as a result of a reduced number of runtime checks. Further, costs associated with system audits are reduced, because there is no need to analyze generated log files for validating the compliance to the properties that are already statically guaranteed. More generally, implementations of the present disclosure simplify audits of systems with complex access control policies, by providing grouping of access control violations, which can also be used for (semi-) automated changing policies to reduce the number of access control violations.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DETAILED DESCRIPTION

Figure 1:
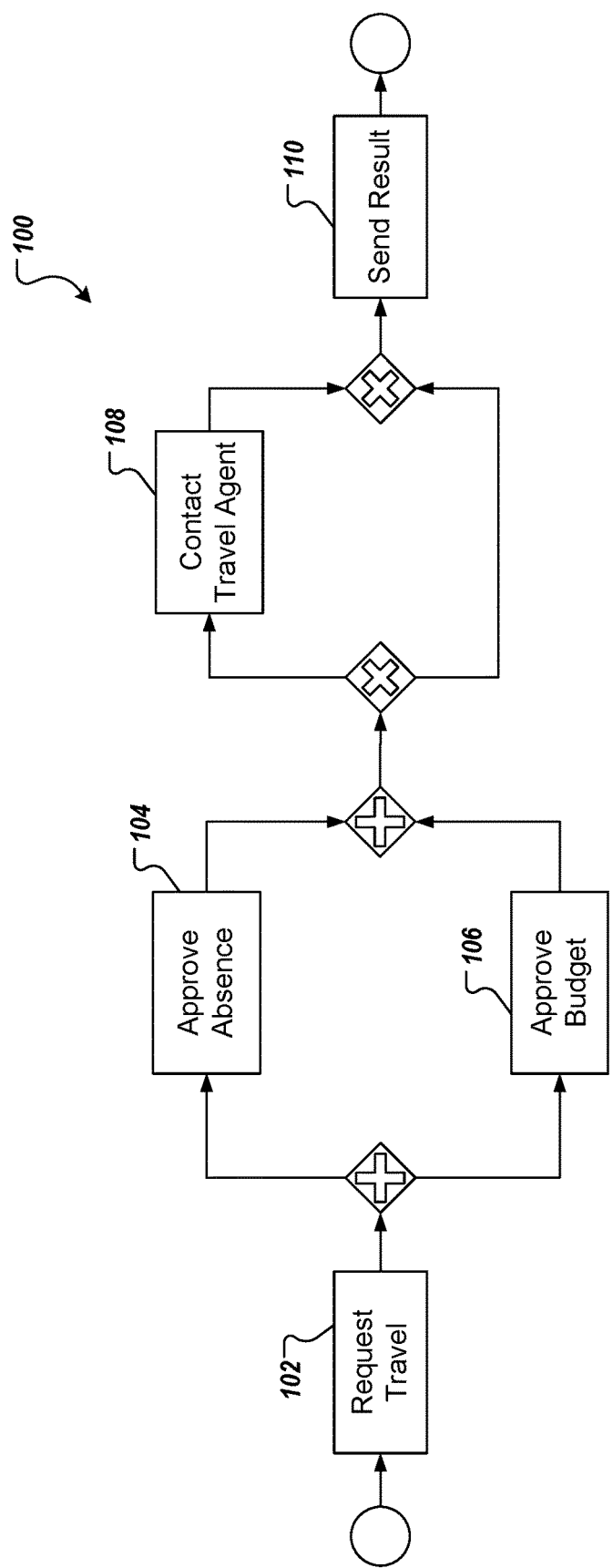
FIG. 1 depicts an example process.

Implementations of the present disclosure are generally directed to using computer-readable process models in post-hoc audits. More particularly, implementations of the present disclosure are directed to using computer-readable process models in post-hoc audits of policy violations. In some examples, the process model is provided as a predefined process model (e.g., using business process modeling notation (BPMN), business process execution language (BPEL)). In some examples, the process model is inferred (e.g., using process mining). In some implementations, during an audit (post-hoc), access control violations are grouped based on a goal, and access control is grouped based on high-level access control constraints (e.g., separation of duty). In some implementations, during runtime, grouped confirmations are provided to minimize the user impact of break-glass overrides.

To provide context for implementations of the present disclosure, process driven systems are an integral part of most modern enterprises. Consequently, process models, such as business process models (BPMs) and process modeling are increasing in importance, not only as a documentation artifact, but also for controlling and steering the execution of business processes. Further, an increasing number of enterprises operate in regulated markets, in which the businesses are required to comply with regulations (e.g., the Health Insurance Portability and Accountability Act (HIPAA) in the healthcare sector, Basel II in the financial sector). Such compliance regulations along with the increased awareness of information technology (IT) security result in the need for modeling, analyzing, and execution techniques for processes that treat security, privacy, and compliance properties as first class citizens.

A further need includes implementation of complex and dynamic security policies. Complex security and compliance policies change frequently. This results in frequent violations of policies. In some examples, such violations are unintended (e.g., users are not permitted to access resources they previously had access to due to a recent policy change). In addition, an increasing number of systems are using more flexible approaches for access control (e.g., break-glass access control) that allow users (in a controlled way) to override access control restrictions. For example, in a medical context, a nurse can override access control to particular patient information in an effort to save the patient's life.

Both trends result in an increased need for effective and efficient mechanisms for the post-hoc audit of access control violations. During an audit, for example, an auditor must review numerous logged accesses that could indicate an incident, and filter out incidents caused by changes in security policies and inaccurate and/or outdated policies. The significant increase in the costs (e.g., both manual and computer resources) for system audits is a direct consequence of this evolution.

In view of this, and as introduced above, implementations of the present disclosure use a process model to, during an audit (post-hoc), group access control violations based on a goal, group access control based on high-level access control constraints (e.g., separation of duty), and, during runtime, provide grouped confirmations to minimize the user impact of break-glass overrides. With regard to runtime (e.g., execution of a process), when a user at runtime requests a break-glass override, the user is presented with a list of related consequences (e.g., other access control constraints that the user might need to override as well). This supports the user in the decision process (e.g., whether to override) as well as allows the user to select the override with the lowest number of violations, but still achieves the goal.

Enterprises often require a multitude of security or compliance requirements that cannot be expressed directly in standard process or work flow modelling languages (e.g., BPMN, BPEL). FIG. 1 depicts an example process model (PM) 100 that models a process that includes a plurality of tasks (actions). The example PM 100 can be generated using secure process modeling (e.g., SecureBPMN). The example PM 100 is provided as a travel approval process, in which a budget and a travel duration need to be approved by different managers before travel is approved. In the depicted example, the PM 100 includes a request travel task 102, an approve absence task 104, an approve budget task 106, a contact travel agent task 108, and a send result task 110.

The example PM 100 can include compliance and/or security requirements. Example compliance and security requirements can include access control, separation of duty (SoD), binding of duty (BoD), and need to know. With regard to access control, access to resources and/or authorization to perform tasks are to be restricted to certain user roles (e.g., clerks, managers) of users. In the depicted example, a simple role hierarchy containing the roles staff and manager can be provided, where every member of the role manager is also a member of the role staff. Further, the role staff has full access (e.g., is allowed to claim, execute, or cancel) for the request travel task 102, and members of the role manager have full access for the approve absence task 104 and the approve budget task 106.

With regard to SoD, tasks can be required to be performed by different users. Consequently, SoD provides that more than one user is required to successfully complete the process. In the depicted example, SoD can be used to ensure that the user requesting travel is not allowed to approve the absence or the budget (even though the user might be a member of the role manager). More specifically, a SoD is provided between the request travel task 102 and the approve absence task 104, a SoD is provided between the request travel task 102 and the approve budget task 106, and a SoD is provided between the approve absence task 104 and the approve budget task 106. Consequently, and in accordance with the example PM 100, the user that performs the request travel task 102 must be different from the user that performs the approve absence task 104 and the approve budget task 106. Further, the user that performs the approve absence task 104 must be different from the user that performs the approve budget task 106.

BoD can be provided to ensure that certain tasks are handled by the same user. Need-to-know can be implemented to ensure that users are only able to access the information that is required for their work. In the depicted example, need-to-know can be implemented to ensure, for example, that the manager approving the absence has only access to the duration of the travel and the manager approving the budget has only access to the travel costs.

In accordance with the example PM 100, if both approvals are given (104, 106), an external service company that assists the travelling employee (e.g., a travel agency for booking accommodations, a company that assists travelers in emergencies) is informed by the contact travel agent task 108. A notification is provided to the user by the send result task 110 indicating whether the user is allowed to travel.

As introduced above, this relatively simple process requires a surprisingly large number of security and compliance requirements. For example, while every employee is allowed to request travel, only a restricted set of persons should be able to approve a travel. For example, a cost center manager should only be able to approve travels that are charged on their cost center. Similarly, project or line managers should only be able to approve the absence of their subordinates. Thus, the simple scenario of the example PM 100 requires a fine-grained access control system that cannot be modeled using a simple role-based access control model.

As another example, to avoid fraud, the same person should not be allowed to approve both the absence and the cost of travel. In some examples, however, a strict application of the SoD principle may hinder regular business operations. Consequently, a more fine-grained variant can be provided (e.g., travel that costs more than $500.00 must be approved by two different users). Accordingly, SoD (as well as complementary BoD) should restrict permissions and not whole tasks (actions) or a process.

As another example, and as noted above, if the travel request is approved, an external service provider (e.g., a travel agency for booking accommodations, a company that assists travelers in emergencies) is contacted. While these companies need to know some details of the travel (e.g., the date of travel, the destination), they are not allowed to learn confidential details (e.g., reason for travel). Applying the principle of need to know, or least privilege, can ensure such strict confidentiality requirements.

In some examples, strict application of security and compliance requirements, such as those described herein, may have disadvantages. For example, needed travel requests could be blocked, because the approving user (e.g., manager) is on leave. Consequently, a controlled transfer of rights (e.g., delegation) can be provided. For example, if the approving user is unavailable, authority to make approvals can be delegated to another user. In some examples, to ensure that delegation of a task does not violate more important compliance rules, restrictions on delegations can be specified (e.g., certain tasks might not be delegated at all; tasks can only be delegated to users that already possess the necessary access rights).

In some examples, studies have shown that even generic solutions for exceptional access control are needed to ensure that security enforcement does not prevent legitimate actions. An exceptional access control includes break-glass access control, in which, for example, a user is able to override one or more access controls to perform a task. For example, in a healthcare scenario, a user (e.g., a nurse) might perform a break-glass access control to retrieve particular patient information that the user is not otherwise allowed to access, in an effort to save the patient's life.

Even the relatively simple scenarios described above already show that describing the non-functional security and compliance requirements is a significant part of the overall process design. In real-world scenarios, the effort for specifying and implementing the non-functional requirements can easily outgrow the effort for specifying and implementing the functional requirements.

Overriding or violating an access control restriction typically occurs in a specific context (e.g., to achieve a particular goal). Consequently, when analyzing such violations, the violations cannot be assessed in isolation. However, for the auditor, it can be difficult and require significant effort to understand the context of every single violation (or override, in the case of a runtime scenario). As described in further detail herein, implementations of the present disclosure supports the auditing process in grouping violations and overrides, and putting violation and overrides into the context of either the goal or access control constraints.

With regard to grouping based on goal, and in accordance with implementations of the present disclosure, access control violations can be grouped based on the goal(s) to be achieved by the underlying process. The idea of grouping access control violations based on the underlying process (e.g., the process model) is based on the observation that users do not want to execute a certain task. Instead, users would like to achieve a particular goal or goals. To group the access control violations based on the process model, implementations of the present disclosure begin with a violation (or override request, in the case of the run-time scenario). A violation is associated with a uniquely identified task instance in the context of a uniquely identified process instance. Consequently, all possible execution paths from this task to an end state (representing the goal) of the process can be determined based on the process model. For each path, respective violations can be retrieved from logs.

In some implementations, violations and/or access grants are grouped based on log information. In some examples, violations and/or granted accesses that are necessary to achieve a certain goal (a successful) end state of the underlying process) are grouped. In some examples, a group represents a path or a set of paths that is necessary to successfully complete the process. This group enable the auditor to assess the violations together, which provides a deeper insight why a certain access control restrictions was violated, enables the analysis violations to be prioritized based on the risk/value associated with a certain goal, and reduces the amount of resources consumed in the auditing process, because violations can be assessed in groups instead of individually.

Algorithm 1, below, provides an example of grouping based on process model:

---

Algorithm 1: Grouping by Process Model (Goals)

procedure GroupViolationsProcessModel ($v_{in}$ : Violation)
   procedure ComputeAllPathsToEndState ($p_{in}$ : Process, $t_{in}$ : task)
      InitTasks ← ComputePrequesiteTasks ( )
      Paths ← { }
      for all t ∈ InitTasks do
         Paths ← Paths ∪ ComputePathToEndState ($p_{in}$, t)
      end for
      return Paths
   end procedure
   task ← TaskOf ($v_{in}$)
   process ← GetProcessModelOfTask (task)
   Paths ← ComputeAllPathsToEndState (process, task)
   Violations ← { }
   GroupedViolations ← { }
   for all p ∈ Paths do
      for all t ∈ GetTasks (p) do
         Violations ← Violations ∪ GetViolationsForTask (t)
      end for
      GroupedViolations ← GroupedViolations ∪ (p, Violations)
   end for
   return GroupedViolations
end procedure

---

An example will now be described with reference to the example PM 100 of FIG. 1. The example includes an investigation into an access violation of the approve absence task 104. In accordance with implementations of the present disclosure, the PM 100 is processed to determined compute the smallest set of predecessor tasks that need to be executed to complete a goal that involves the approve absence task 104. In the example of FIG. 1, this set only contains the request travel task 102 as it is the predecessor of the approve absence task 104 and the approve budget task 106, both of which need to be executed to complete the goal of the example process. Next, all paths from the predecessor tasks to the end states of the process are determined.

In the depicted example, two paths are provided. A first path represents an approved travel request: a user completes the request travel task 102, and both the approve absence task 104 and the approve budget task 106 are successfully (i.e., with result approved) completed, and an automated service task (the contact travel agent task 108) informs the travel agency. The user is informed about the approval (the send result task 110). A second path a rejected travel request: a user completes the request travel task 102, and at least one of the approve absence task 104 and the approve budget task 106 is completed with the result of not approved (e.g., !approved), and the user is informed about the rejection of approval (the send result task 110). For both example paths, violations are selected from a log and are automatically grouped based on the paths. The auditor can replay each sequence of actions along the tasks that were actually executed, which enables the auditor to immediately identify all overrides that belong together and, thus, assess any associated risk.

Absent implementations of the present disclosure, an auditor would need to analyze the unstructured log files for granted and denied access control decisions, and manually bring them into an order that allows the auditor to access the root cause of the violation as well as the associated risk.

With regard to grouping based on security specifications (access control), enterprise systems are subject to complex security policies that are not only limiting access to a single resource or tasks. For example, SoD and BoD are common constraints in processes. As discussed herein, SoD and BoD require that certain set of tasks (or a subset thereof) need to be executed by different subjects (SoD), or the same subject (BoD). Consequently, for tasks that include SoD or BoD constraints, all violations for accessing tasks that are reachable through SoD or BoD constraints (i.e., the transitive closure) from the task under investigation need to be considered.

For grouping access control violations based on security specifications, data sources, such as the process model, the access control specification, or log files (system traces) may be queried to associate a violation with a specific task as well as for computing the all related access control restrictions such as the transitive closure of all relevant binding-of-duty (BoD) or separation-of-duty (SoD) constraints.

Algorithm 2, below, provides an example of grouping based on security specifications:

---
Algorithm 2: Grouping by Security Specifications (Access Control)

procedure GroupViolationsAccessControl ($v_{in}$ : Violation)
    task ← TaskOf ($v_{in}$)
    process ← GetProcessModelOfTask (task)
    policy ← SecurityPolicyOfProcess (process)
    Tasks ← ComputeTransitiveSoDBoDClosure (policy, process, task)
    Violations ← { }
    for all t ∈ GetTasks (p) do
        Violations ← ViolationsGetViolationsForTask (t)
    end for
    GrantedAccess ← { }
    for all t ∈ GetTasks (p) do
        GrantedAccess ← GrantedAccessGetGrantedAccessForTask (t)
    end for
    return (GrantedAccess, Violations)
end procedure

---

An example will now be described with reference to the example PM 100 of FIG. 1. The example includes an investigation into an access violation of the approve absence task 104. In accordance with implementations of the present disclosure, the access control grouping reveals that this violation needs to be analyzed in the context of any regular access or override access to the approve budget task 106 within the same process instance. Consequently, the auditor can easily access all related access control constraints together and, thus, access any associated risk.

Absent implementations of the present disclosure, and because the approve budget task 106 is controlled by a SoD constraint, an auditor would need to manually analyze whether this access also results in a violation of the SoD constraints. Moreover, to access the overall risk, all SoD/BoD violations that are directly or indirectly linked to these tasks would need to be manually assessed. Implementations of the present disclosure relieve this effort.

In some implementations, groupings can be combined to provide a more in-depth analysis of access control violations in process-driven systems.

Figure 2:
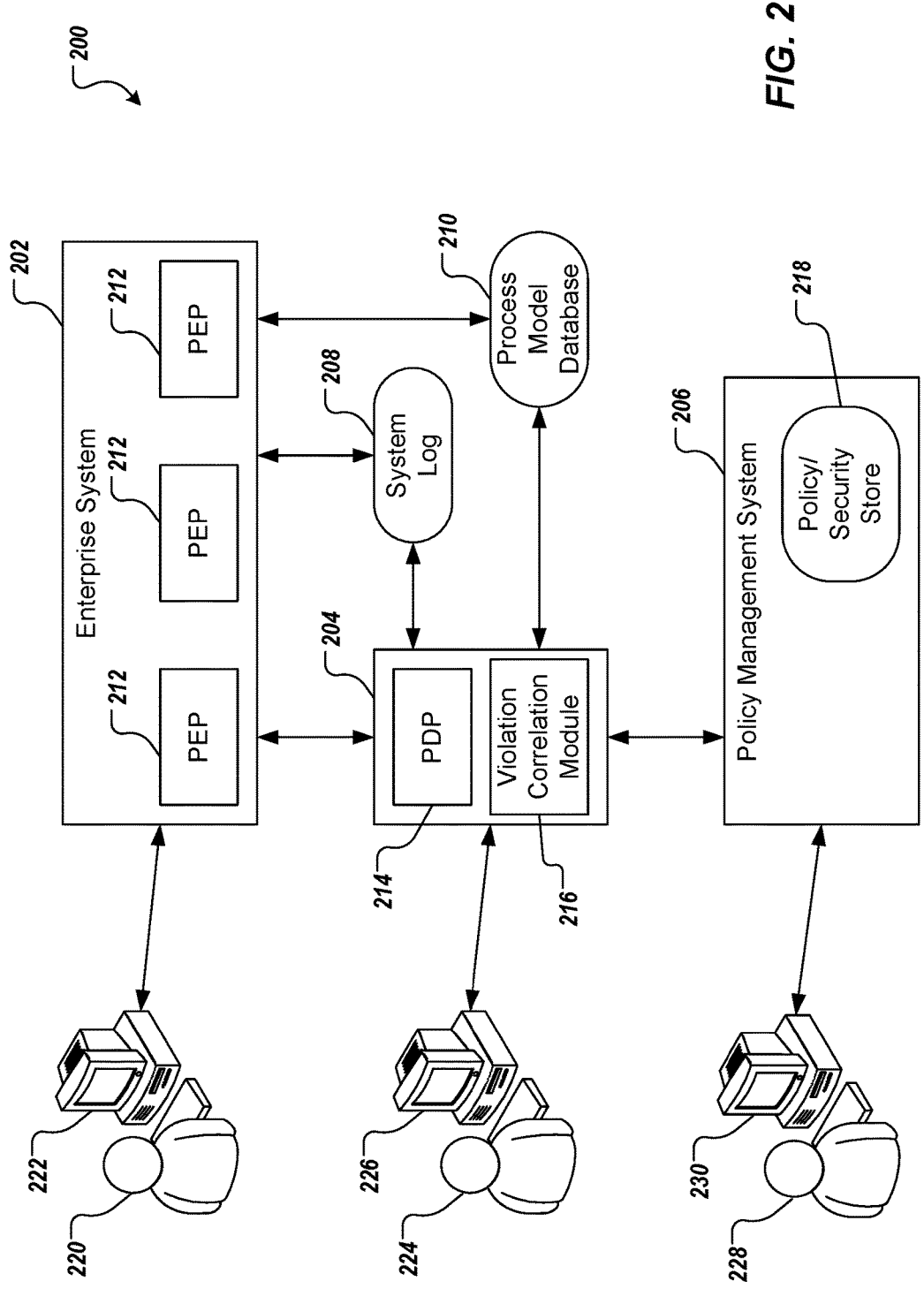
FIG. 2 depicts an example system architecture for executing implementations of the present disclosure.

FIG. 2 depicts an example system architecture 200 for executing implementations of the present disclosure. In the depicted example, the systems architecture includes an enterprise system 202, an auditing system 204, a policy management system 206, a system log 208, and a process model database 210. In some examples, the enterprise system 202, the auditing system 204, and the policy management system 206 are each provided as one or more computer-executable applications executed by one or more processors.

For example, the enterprise system 202 can include enterprise resource planning (ERP) system, or customer relationship management (CRM) system provided by a service provider. In some examples, a user 220 can interact with the enterprise system 202 using a computing device 222. For example, the enterprise system 202 can be hosted by the service provider (e.g., on one or more servers), and can communicate with the computing device 222 over a network (e.g., the Internet). In some examples, the enterprise system 202 executes one or more processes based on input from one or more users. For example, the user 220 can use the computing device 222 to submit a travel request to the enterprise system 202 (e.g., perform the request travel task 102 of FIG. 1).

In the depicted example, the enterprise system 202 includes one or more policy enforcement points (PEPs) 212. In some examples, a PEP 212 is a component (e.g., computer-executable program code) that, at runtime, enforces a security policy and logs access control decisions (e.g., access granted/denied), as well as overridden access control requests (e.g., break-glass). For example, a PEP 212 can transmit an access control request and receive an access control decision, which can be communicated to a user.

In the depicted example, the auditing system 204 includes a policy decision point (PDP) 214, and a violation correlation module (VCM) 216. In some examples, the PDP 214 evaluates, at runtime, an access control request and decides, based on the current security state, if this request should be granted or not. For example, the PDP 214 can receive an access control request from a PEP 212, can determine an access control decision, communicate the access control decision back to the PEP 212, and log the access control decision in the system log 208. For example, the PDP 214 can approve/disapprove an approve absence request (e.g., the approve absence task 104 of FIG. 1) based on who is providing the approval (e.g., if the same user that requested travel is also approving the absence, the access control decision can be a denial). In some implementations, the VCM 216 performs grouping based on process model and grouping based on security specifications, as described herein. The VCM 216 provides correlated and subsequent access analysis to a system auditor 224, who interacts with the auditing system 204 using a computing device 226 (e.g., over a network).

In some examples, the system log stores all access control requests and decisions generated during runtime of the process, as well as any information that might be necessary during a post-hoc system audit.

In some examples, the process model database stores the process model(s) that are executed by the enterprise system 202. In some examples, a process model can be an inferred process model (e.g., developed empirically based on process mining). In some examples, a process model can be an a priori defined process model (e.g., using BPMN, BPEL), which controls the actual execution of the underlying process.

In some implementations, the policy management system 206 enables security policies to be created, edited, and deleted. The policy management system 206 includes a policy/security store 218 (database) that stores configurations that describe the current security policy (e.g., the access control policy, user-role-configuration, etc.) of respective processes. In some examples, an administrator 228 can interact with the policy management system 206 using a computing device 230 (e.g., to create, edit, or delete policies).

Figure 3A:
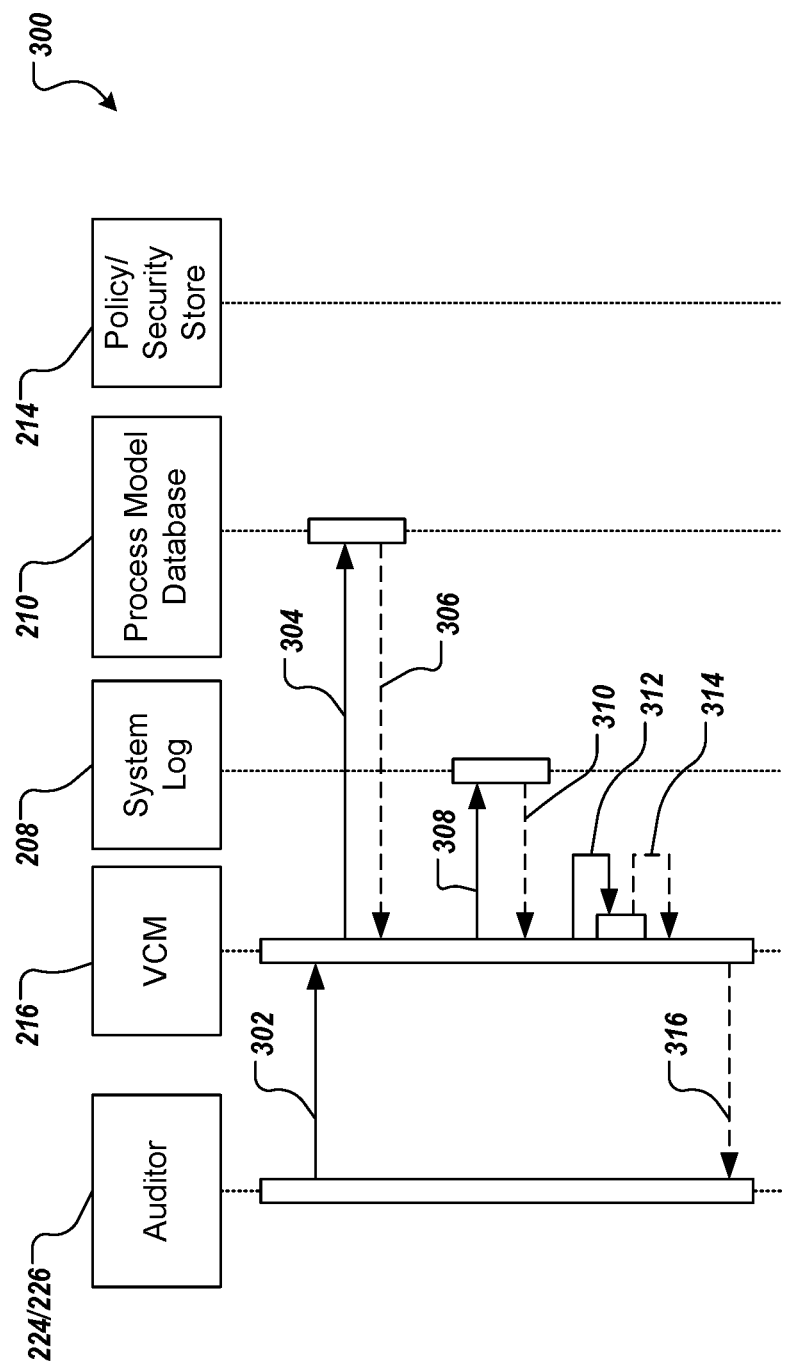
FIGS. 3A and 3B depict example sequence diagrams in accordance with implementations of the present disclosure.
Figure 3B:
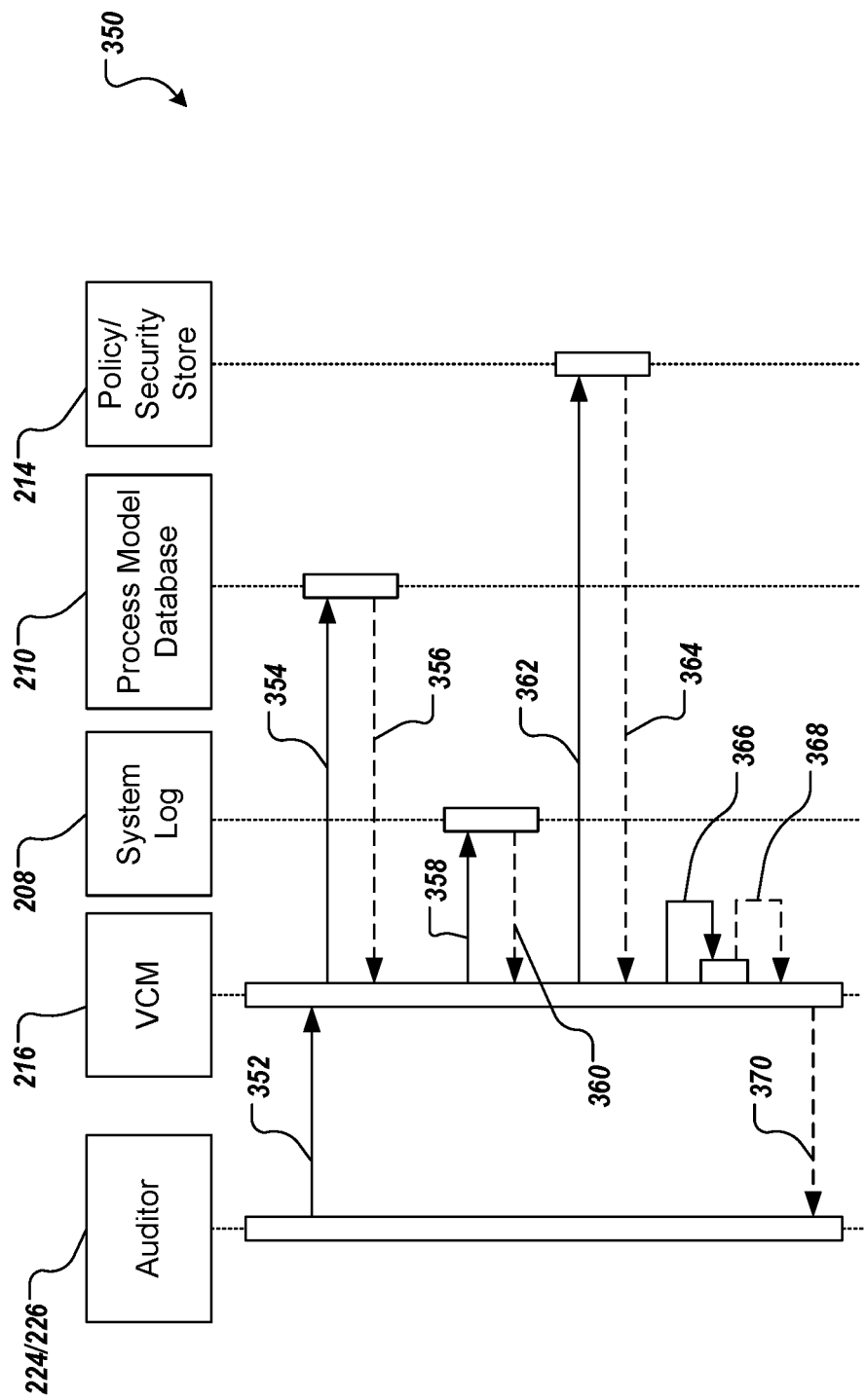

Referring now to FIGS. 3A and 3B, the example use case will be described in further detail. FIGS. 3A and 3B respectively depict example sequence diagrams 300, 350 in accordance with implementations of the present disclosure. The sequence diagrams 300, 350 depict example communications between components of the system architecture 200 of FIG. 2 in accordance with implementations of the present disclosure.

The example sequence diagram 300 of FIG. 3A is directed to correlation based on process definition. More specifically, the example sequence diagram 300 depicts correlation of violations based on the process definition (process model). In the depicted example, the auditor 224, using the computing device 226, begins an analysis of a violation of a task. For example, the auditor 224 interacts (302) with the VCM 216 to initiate correlation based on the process definition (e.g., submits a request to the VCM 216 for a particular task associated with the violation being investigated). In response, the VCM 216 queries (304) the process model database 210, which returns (306) the process model that contains the task, for which the violation is being analyzed. The VCM 216 requests (308) all (security relevant) log entries (events) with from the system log 208 with respect to the analyzed process instance (e.g., the execution of the process that is currently being analyzed). The system log 208 returns (310) the log entries.

The VCM 216 correlates all security relevant log entries that belong to each other based on the process definition. For example, the VCM 216 determines (312) all paths to the end state (goal) of the process, as well as, for each path, groups (314) violations. The VCM 216 returns (316) the correlation based on the process definition to the auditor 224. In some examples, the VCM returns the grouped access control violations (e.g., as mapping from a violation to a set of paths (traces) that are related to the violation). In some examples, a user interface enables the auditor to step-wise replay or simulate the paths to assess the impact of the violation, or to test changes to the access control model or the process model.

The example sequence diagram 350 of FIG. 3B is directed to correlation based on security specification(s). More specifically, the example sequence diagram 350 depicts correlation of violations based on the security polic(y/ies) (access control). In the depicted example, the auditor 224, using the computing device 226, begins an analysis of a violation of a task. For example, the auditor 224 interacts (352) with the VCM 216 to initiate correlation based on the process definition (e.g., submits a request to the VCM 216 for a particular task associated with the violation being investigated). In response, the VCM 216 queries (354) the process model database 210, which returns (356) the process model that contains the task, for which the violation is being analyzed. The VCM 216 requests (358) all (security relevant) log entries (events) with from the system log 208 with respect to the analyzed process instance (e.g., the execution of the process that is currently being analyzed). The system log 208 returns (360) the log entries.

The VCM 216 requests (362) security/policy information (e.g., permissions, role hierarchy of any involved user for the process instance being analyzed) from the policy/security store 214, which returns (364) the security/policy information to the VCM 216. The VCM 216 correlates all security relevant log entries that belong to each other based on the security/policy information and the process definition. For example, the VCM 216 determines (366, 368) all tasks, violations, and access grants of the process instance. The VCM 216 returns (370) the correlation based on the process definition to the auditor 224. In some examples, the VCM 216 returns the grouped access control violations (e.g., as a mapping from a violation to a set of related access control requirements and their mapping to the process model).

In some implementations, a runtime process is provided, which presents a list of violations that would occur, if a user were to perform a break-glass access during execution of a particular process. For example, the user requests break-glass access and two or more options are presented for the user to select from (e.g., the option with the least number of subsequent violations). In some examples, Algorithm 1, provided above, is executed when a user tries to override a denied access control decision, and a set of paths that result in a successful execution of the process is ordered by the number of access control constraints that subsequently need to be overridden. This set of paths, ordered from the path with the least number of overrides to the paths with the most overrides, is presented to the user as a recommendation on how to proceed. In some implementations, the user might have the choice to select between different tasks. In such an example, the system could present the user with the options for all tasks the user might want to override to allow the users to select the next step with the total least number of subsequent overrides, for example.

In another runtime implementation, an explanation can be provided to users as to the reasons for a denied access control. For example, Algorithm 1 and Algorithm 2, provided above, are executed when an access control is denied, and a user is requesting additional information. The information computed by Algorithms 1 and 2 is shown to the users. In some implementations, the interface for the users might be restricted (e.g., not allowing for replaying process steps or simulating changes in the access control).

Figure 4:
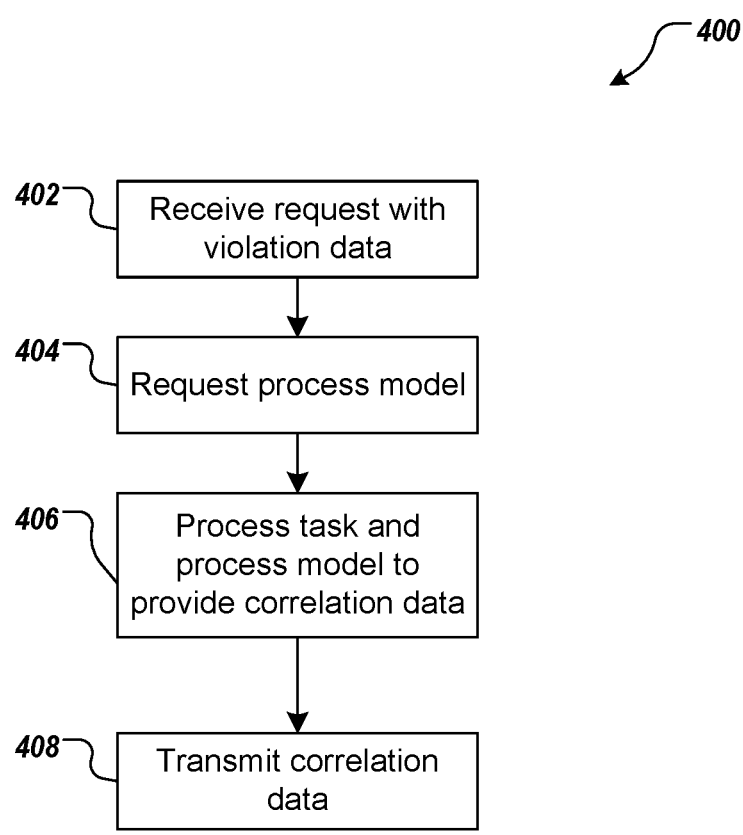
FIG. 4 is a flowchart illustrating an example process that can be executed in implementations of the present disclosure.

FIG. 4 is a flowchart illustrating an example process 400 that can be executed in implementations of the present disclosure. In some implementations, the example process 400 can be realized using one or more computer-executable programs that are executed using one or more computing devices. In some examples, the example process 400 is executed to analyze access control violations of a computer-implemented process.

A request including violation data is received (402). For example, the VCM 216 of FIG. 2 receives a request from the auditor 224, using the computing device 226. In some examples, the violation data indicates an access control violation that occurred during execution of the computer-implemented process (e.g., the process 100 of FIG. 1). A process model is requested (404). For example, the VCM 214 requests the process model from the process model database 210. In some examples, the process model is provided as computer-readable representation of the computer-implemented process, and includes a task corresponding to the access control violation.

The task and the process model are processed to provide correlation data (406). For example, the VCM 214 processes the task and the process model to provide the correlation data. In some examples, the correlation data includes grouped violations, a set of granted accesses, and/or a set of violations. In some examples, the task and the process model are processed based on Algorithm 1, described above, to provide the grouped violations. In some examples, the task and the process model are processed based on Algorithm 2, described above, to provide the set of granted accesses and the set of violations. The correlation data is transmitted to a client-side computing device for display to a user (408). For example, the VCM 216 transmits the correlation data to the computing device 226 for display to the auditor 224.

Figure 5:
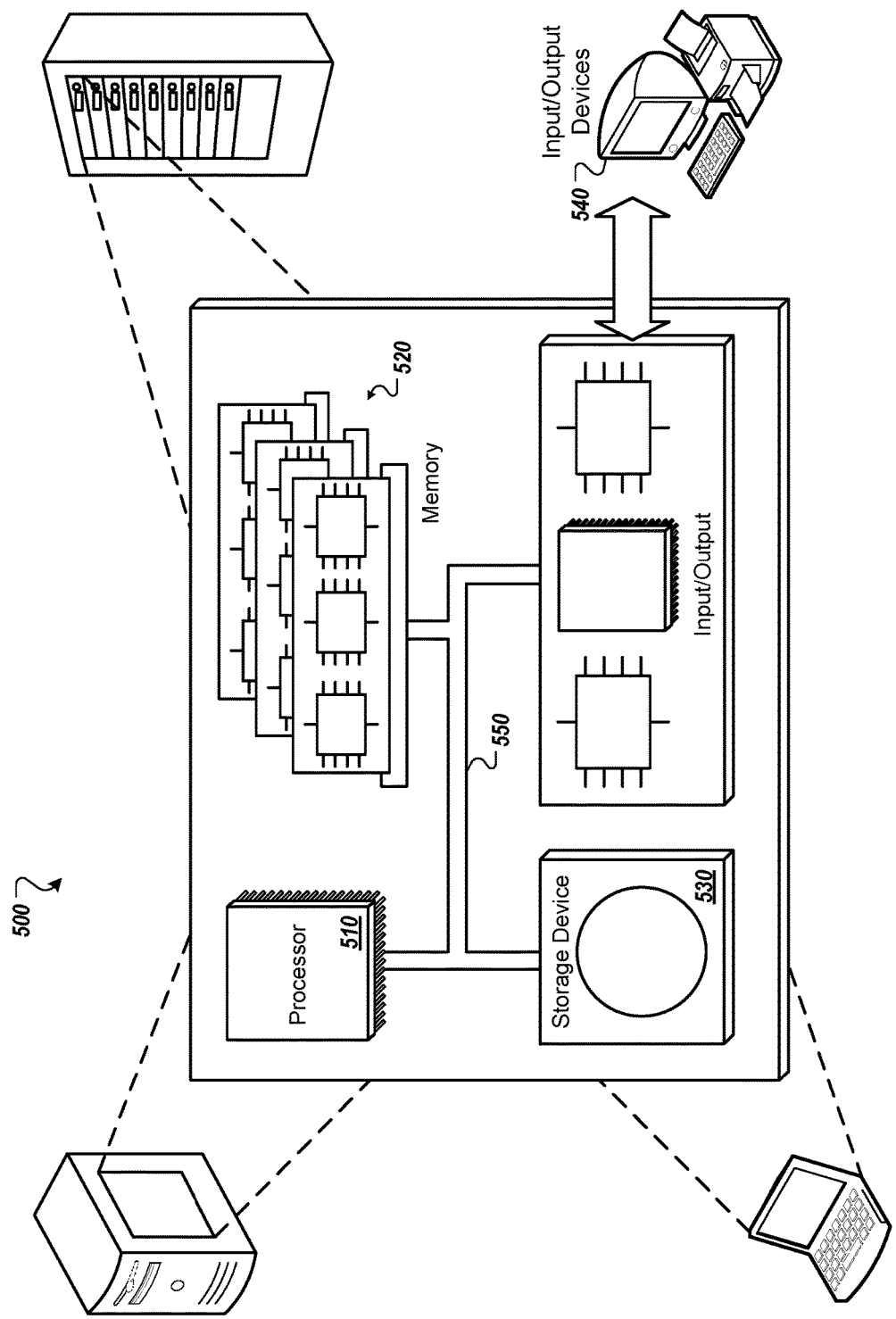
FIG. 5 is a schematic illustration of example computer systems that can be used to execute implementations of the present disclosure.

FIG. 5 is a schematic illustration of example computer systems 500 that can be used to execute implementations of the present disclosure. The system 500 can be used for the operations described in association with the implementations described herein. For example, the system 500 may be included in any or all of the server components discussed herein. The system 500 includes a processor 510, a memory 520, a storage device 530, and an input/output device 540. Each of the components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for analyzing access control violations of a computer-implemented process, the method being executed using one or more processors and comprising:
　receiving, by the one or more processors, a request comprising violation data indicating an access control violation that occurred during execution of the computer-implemented process;
　requesting, by the one or more processors, a process model from a process model database, the process model comprising a computer-readable representation of the computer-implemented process, the process model comprising a task corresponding to the access control violation;
　processing, by the one or more processors, the task and the process model to provide correlation data comprising one or more of grouped violations, a set of granted accesses, and a set of violations by:
　　determining, based on the task and the process model, a set of predecessor tasks relative to the task, each task in the set of predecessor tasks being required to be executed to achieve a goal of the process,
　　determining, based on the set of predecessor tasks, a set of paths, each path defining a series of tasks from a respective predecessor task that are performed to achieve the goal of the process, and
　　providing the grouped violations based on paths in the set of paths and provided based on log data provided from a system log, the log data comprising one or more access request violations; and
　transmitting, by the one or more processors, the correlation data to a client-side computing device for display to a user.

2. The method of claim 1, wherein processing the task and the process model comprises:
　receiving a computer-readable security policy associated with the process model; and
　identifying constrained tasks of the process model based on the computer-readable security policy, wherein the set of violations and the set of granted accesses are provided based on the constrained tasks.

3. The method of claim 2, wherein the set of violations and the set of granted accesses are further provided based on log data provided from a system log, the log data comprising one or more access request violations.

4. The method of claim 2, wherein constraints associated with constrained tasks comprise one or more of separation of duty, binding of duty, and need-to-know.

5. The method of claim 1, wherein the process model comprises a predefined process model, or an empirically determined process model.

6. A non-transitory computer-readable storage medium coupled to one or more processors and having instructions stored thereon which, when executed by the one or more processors, cause the one or more processors to perform operations for analyzing access control violations of a computer-implemented process a, the operations comprising:
　receiving a request comprising violation data indicating an access control violation that occurred during execution of the computer-implemented process;
　requesting a process model from a process model database, the process model comprising a computer-readable representation of the computer-implemented process, the process model comprising a task corresponding to the access control violation;
　processing the task and the process model to provide correlation data comprising one or more of grouped violations, a set of granted accesses, and a set of violations by:
　　determining, based on the task and the process model, a set of predecessor tasks relative to the task, each task in the set of predecessor tasks being required to be executed to achieve a goal of the process,
　　determining, based on the set of predecessor tasks, a set of paths, each path defining a series of tasks from a respective predecessor task that are performed to achieve the goal of the process, and
　　providing the grouped violations based on paths in the set of paths and provided based on log data provided from a system log, the log data comprising one or more access request violations; and
　transmitting the correlation data to a client-side computing device for display to a user.

7. The computer-readable storage medium of claim 6, wherein processing the task and the process model comprises:
　receiving a computer-readable security policy associated with the process model; and
　identifying constrained tasks of the process model based on the computer-readable security policy, wherein the set of violations and the set of granted accesses are provided based on the constrained tasks.

8. The computer-readable storage medium of claim 7, wherein the set of violations and the set of granted accesses are further provided based on log data provided from a system log, the log data comprising one or more access request violations.

9. The computer-readable storage medium of claim 7, wherein constraints associated with constrained tasks comprise one or more of separation of duty, binding of duty, and need-to-know.

10. The computer-readable storage medium of claim 8, wherein the process model comprises a predefined process model, or an empirically determined process model.

11. A system, comprising:
　a computing device; and
　a computer-readable storage device coupled to the computing device and having instructions stored thereon which, when executed by the computing device, cause the computing device to perform operations for analyzing access control violations of a computer-implemented process, the operations comprising:

receiving a request comprising violation data indicating an access control violation that occurred during execution of the computer-implemented process;

requesting a process model from a process model database, the process model comprising a computer-readable representation of the computer-implemented process, the process model comprising a task corresponding to the access control violation;

processing the task and the process model to provide correlation data comprising one or more of grouped violations, a set of granted accesses, and a set of violations by:

determining, based on the task and the process model, a set of predecessor tasks relative to the task, each task in the set of predecessor tasks being required to be executed to achieve a goal of the process, determining, based on the set of predecessor tasks, a set of paths, each path defining a series of tasks from a respective predecessor task that are performed to achieve the goal of the process, and providing the grouped violations based on paths in the set of paths and provided based on log data provided from a system log, the log data comprising one or more access request violations; and transmitting the correlation data to a client-side computing device for display to a user.

12. The system of claim 11, wherein processing the task and the process model comprises:

receiving a computer-readable security policy associated with the process model; and identifying constrained tasks of the process model based on the computer-readable security policy, wherein the set of violations and the set of granted accesses are provided based on the constrained tasks.

13. The system of claim 12, wherein the set of violations and the set of granted accesses are further provided based on log data provided from a system log, the log data comprising one or more access request violations.

14. The system of claim 12, wherein constraints associated with constrained tasks comprise one or more of separation of duty, binding of duty, and need-to-know.

\* \* \* \* \*